United States Patent [19]

Godin

[11] 4,327,980
[45] May 4, 1982

[54] METHOD AND APPARATUS FOR PRODUCING OPTICAL EFFECTS

[76] Inventor: Michael C. Godin, 9 Gracefield Gardens, London SW16 2SZ, England

[21] Appl. No.: 177,585

[22] Filed: Aug. 13, 1980

[51] Int. Cl.³ .................. G03B 35/08; G03B 35/00
[52] U.S. Cl. .................................. 354/113; 354/110
[58] Field of Search .............. 354/110, 113; 350/130, 350/144

[56] References Cited

U.S. PATENT DOCUMENTS

| 1,595,984 | 8/1926 | Ames | 350/144 X |
| 2,651,233 | 9/1953 | Tondreau et al. | 354/110 |
| 3,362,773 | 1/1968 | Mihara | 354/113 X |

FOREIGN PATENT DOCUMENTS

| 506447 | 5/1939 | United Kingdom . |
| 756359 | 9/1956 | United Kingdom . |
| 760523 | 10/1956 | United Kingdom . |

*Primary Examiner*—Donald A. Griffin
*Attorney, Agent, or Firm*—Watson, Cole, Grindle & Watson

[57] ABSTRACT

This invention relates to an optical method which produces an image of an apparently hollow, egg-shell-like three dimensional object by photographing a solid object and to an apparatus for carrying out the method. It is also possible to make an opaque object appear both hollow and transparent using the same apparatus.

13 Claims, 3 Drawing Figures

METHOD AND APPARATUS FOR PRODUCING OPTICAL EFFECTS

BACKGROUND OF THE INVENTION

The present invention relates to a method and apparatus for producing optical effects, and more particularly to producing such effects by use of a phenomenon which I will call negative perspective in combination with normal perspective, which I will call positive perspective. Using this method, opaque objects can be made to appear semi-transparent, or, more importantly, solid, three-dimensional objects can be made to appear as hollow, egg-shell-like structures which appear to have the same external dimensions as the original objects. This latter transformation can be used to photograph people or animals in fantastic or fabulous forms. An example of type of transformation which can be achieved is depicted in the wood-engraving Rind, by the famous Dutch graphic artist M. C. Escher. A reproduction of this engraving appears in my article "Negative Perspective Optics," BKSTS Journal, June 1980, page 272.

Normal perspective is the well known effect whereby objects shown in an image, e.g., a painting or photograph, appear to grow smaller with increasing distance from the observer; a result of this is that parallel lines may appear to converge into the distance. The renaissance painters investigated this effect and discovered that a point could be defined at which such a set of parallel lines would appear to meet; such a point is known as a "vanishing point."

By making use of a number of these vanishing points (generally three are sufficient), each being derived from the point of co-incidence of a set of lines known to be representative of parallel lines, it is possible to discover what I will call the "viewing point" of a picture, which is the one point from which the picture may be properly viewed in order to produce the same image on the retina as the real scene would produce when viewed from another point, which I will call the "station point." It is also possible to determine the viewing point of a photograph from a knowledge of the optics of the camera used.

The effect of normal perspective generally holds for a single lens system such as the eye, or a camera. (Although a camera will frequently have more than one lens, the arrangement is generally to simulate the single lens properties of the eye). However, this relationship does not necessarily apply to a multiple lens system, such as a lens in combination with a further observing lens, e.g. the eye or a camera. If, for example, the magnification of a convex lens is investigated in relation to the distance of an object from the lens when it is relatively near the lens, it is found that within a first range of distances of the eye (or camera lens) from the convex lens, the magnification decreases with increasing object distance from this lens, i.e., the normal perspective relationship applies. However, over a second range of distances of the eye from the convex lens, it is found that magnification increases with increasing object distance from the lens, i.e., objects further away are increasingly magnified and therefore appear larger. This is known as negative perspective, and parallel lines observed under these conditions appear to diverge. Between the two, with the eye at the focal point of the lens, we have conditions of zero perspective.

SUMMARY OF THE PRESENT INVENTION

The present invention provides a method of creating an optical effect comprising viewing an object from a first, real station point, viewing said object from a second, virtual station point coincident with the real station point, and superimposing images produced by viewing the object from the two noted station points.

The apparatus to be described provides a first optical arrangement for producing an image of the visible side of an object in normal positive perspective and a second optical arrangement for producing an image of the back of the object (the normally obscured side) in negative perspective. The obscured and visible sides of an object have the same outline. The two images thereby produced can be superimposed in registration (or more importantly selected portions of them can be superimposed in registration) using suitable means. If, for example, the images are of an opaque object with no concavities (which complicate the issue), superimposition (double-exposure) of one image with the other will produce a semi-transparent effect, with the back image in negative perspective, appearing to be in normal, positive perspective but the convex surface appearing to be concave, and seeming to show through the front image in normal positive perspective. In a moving picture (image) the entire object will move in correct perspective and motion parallax, and every point on the surface will be visible at all times.

Experimental film has shown that another related effect, which I will call the hollow-egg-shell effect, is more interesting than the semi-transparent effect. In this effect the positive perspective image is made to superimpose, and also obscure the negative perspective image. Portions of both images are removed (otherwise the negative perspective image would not be visible). The result is to produce a figure such as depicted in the wood-engraving Rind.

BRIEF DESCRIPTION OF THE DRAWINGS

Features and advantages of the present invention will become apparent from the following description when considered in conjunction with the accompanying drawings, in which.

DETAILED DESCRIPTION OF THE PREFERRED EMBODIMENTS

Figure 1:
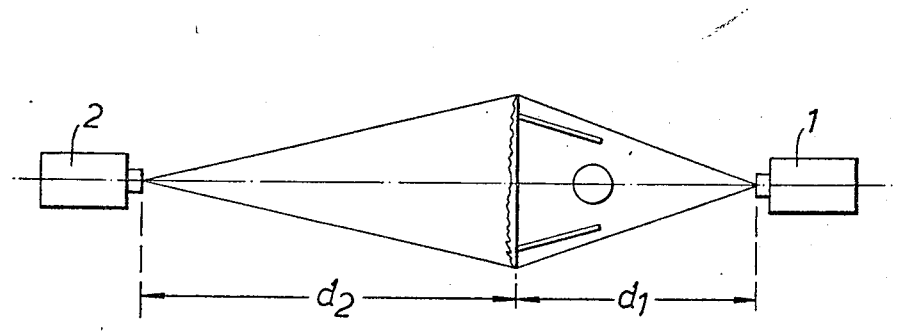
FIG. 1 is a schematic representation of an embodiment of the invention.

Referring to FIG. 1, the first optical arrangement comprises a first image-producing means, camera 1, disposed a distance $d_1$ from a lens. An object is interposed between camera 1 and the lens and camera 1 is selected to view and photograph the object directly. The second optical arrangement comprises the combination of a second image-producing means, camera 2, and the lens itself, camera 2 being disposed a distance $d_2$ from the lens. Camera 2 views and photographs the object through the lens and as will be explained hereinafter, the image produced can be arranged to be in negative perspective.

It can be shown that when one views a negative perspective photograph of an object from the viewing point (which should be regarded as being behind the photograph), the image on the retina is precisely the same as would be produced if we viewed the object from a certain station point on the other side, and saw, not the side facing us, but the side obscured. In reality this is impossible, hence the station point of a negative perspective picture is not a real station point but a "virtual" station point. In order to obtain the optimum "semi-transparent" or "hollow-egg-shell" effects referred to above, the two images must be obtained effectively from the same station point. For the apparatus shown in FIG. 1, such a station point can be obtained at the forward nodal point of camera 1 by placing the forward nodal points of the cameras at conjugate foci of the lens, derived from the expression:

$$\frac{1}{d_1} + \frac{1}{d_2} = \frac{1}{f}$$

where f is the focal length of the lens.

This expression is derived from the standard lens equation:

$$\frac{1}{u} + \frac{1}{V} = \frac{1}{f}$$

Moreover, in many cases it is advantageous that the two images obtained be of the same size in order to facilitate registration, and this will result if:

$$\frac{d_1}{d_2} = \frac{F_1}{F_2}$$

where $F_1$ and $F_2$ are the focal lengths of cameras 1 and 2 respectively.

These equations provide:

$$d_1 = \frac{F_1 + F_2}{F_2} f$$

$$\text{and } d_2 = \frac{F_1 + F_2}{F_1} f$$

Therefore, $d_1$ and $d_2$ are uniquely defined for fixed focal lengths of lens and cameras, if the images are to be of the same size and to have identical station points. (In practice these equations will be approximate).

Apparatus as shown in FIG. 1 was assembled using a Fresnel lens of focal length 7.9" (200.6 mm), and cameras of $F_1 = 30$ mm and $F_2 = 135$ mm. Using the above equations, the distances $d_1$ and $d_2$ were found to be $d_1 = 9.6"$ (244 mm), $d_2 = 43.5"$ (1,100 mm.)

A convenient method of aligning the apparatus is to fix one end of each of two thin rods on to one side of the lens so that both rods are pointing towards the station point. Each camera is then positioned in such a way as to produce an end-view image of the rods, i.e., taken axially along the rods, and the cameras will then be correctly positioned with respect to the lens, one camera viewing the rods directly end-on and the other camera viewing the rods through the lens and in negative perspective.

In general a grid of such rods (or preferably truncated cones) covering the entire picture area, and pointing towards the station point, can be used to check the registration and distortion of any system. A satisfactory system is one in which both cameras can photograph the entire grid end-on, and in which both the photographs can be superimposed so that all the rods are in register. (In a zero-perspective system all the rods would be arranged parallel). In the above-described example, the cameras were positioned in accordance with the distances stated above, and an object, in this case an opaque bust of a human head, with the areas of the head which are to appear invisible coloured in blue dye, was photographed by both cameras in a variety of positions by rotating the object through 10° between each photograph.

A particular effect was obtained by taking 36 photographs of the object with each camera, the object being rotated by 10° between each set of photographs. The 72 were all enlarged to the same size. The dark backgrounds and the blue coloured areas of the head were cut out of the photographs (hand-cut matte fashion). Each pair of photographs were then attached to one of 36 identical photographs of a background scene, in registration using the end on view of the two rods to obtain this. First the negative perspective view was pasted onto the background, and then the positive perspective view pasted over the negative perspective view, so obscuring part of it and also part of the background. The 36 composites were then photographed in sequence and register, one frame at a time, with a cine-camera. The final result shows that the opaque bust has been converted into a hollow-egg-shell-Rind-like figure, which rotates, and moves about the screen area in correct perspective and motion parallax.

Alternative arrangements to that shown in FIG. 1 may be used to provide similar effects. A large lens system (LLS) of sufficient diameter or more correctly aperture to be able to provide a suitable negative perspective image is required and the LLS may comprise one or more mirrors as an alternative to, or in combination with, a refractive lens. The aperture of the lens must be larger than the portion of the object to be viewed in negative perspective. Any optical element or combination thereof may be used as long as the point occupied by the forward nodal point of camera 1 is focussed to another point occupied by the forward nodal point of camera 2, otherwise a registrable image cannot be obtained. In addition, the cameras must be chosen to be focusable to the corresponding object distance, including any depth of field considerations.

In a system capable of filming live subjects it is clear that the cameras used would have to be synchronised cine-cameras or television video cameras. The Large (aperture) Lens System (referred to in my article Negative Perspective Optics as LLS, and replacing the Fresnal screen of the experimental setup) can take a variety of forms, such as a large achromatic condenser lens, or an ellipsoidal reflector, or a pair of ellipsoidal reflectors, or a pair of paraboloidal reflectors, or a spherical reflector combined with other elements, and so on. The total system must satisfy the following minimum conditions:

1. The forward nodal point of Camera 1 must be focused by LLS to another point occupied by the forward nodal point of Camera 2. This condition is necessary to achieve coincident real and virtual station points.
2. The aperture of LLS must be larger than the subjects being photographed.
3. The cameras must be chosen to be focussable to the corresponding object distance, including any depth of field consideration.

In some circumstances there may be additional requirements:

(1) The images must be of the same size.
(2) Putting aside the issue of mirror-imaging, the object must occupy the same position in relation to the perforations. This means that the optical axes of both cameras must lie on the same optical path.
(3) The distortion produced by Camera 1 must be negligable; or alternatively it must be precisely the same as that produced by the Camera 2-LLS combination. (Both could be in Scope, for example).
(4) The distortion produced by the Camera 2-LLS combination (i.e., the distortion in the negative perspective image) must be the same as Camera 1 (negligable or otherwise). The distortion produced by one ellipsoidal mirror, as in FIG. 2 which will be described later is considerable.
(5) The films might have to be of the same gauge.

After the initial filming, by using Camera 2 as a projector (rotoscope fashion) and refilming with Camera 1, none of these auxiliary conditions need be met. In addition there could be a number of advantages:

1. If Camera 1 is made to accept bi-pack loads, then the system could be used with travelling mattes to produce the hollow-egg-shell effect.
2. When used as a projector, Camera 2 will produce an aerial image in the region of space originally occupied by the subject. The system has much in common with the Oxberry aerial-image system, and like this system the aerial image could be combined with real objects or art-work, e.g., objects could be made to pass through the hollow heads of live actors, such as depicted in the lithograph, Bond of Union by M. C. Escher.
3. With both cameras able to accept bi-pack loads and convertable to projectors, rotoscope fashion, the system would be even more flexible.

When Cameras 1 and 2 are television video cameras, it is possible to produce the effect live, but on the other hand it is not so easy to employ the aerial-image technique to undistort the negative perspective image. In this instance it will be necessary to use a LLS system that does not distort such as a well designed condenser lens, or the double paraboloidal system shown in FIG. 3. Alternatively, a further optical element could be added to a distorting system to undistort it (a second ellipsoidal reflector could undistort the image produced by a first ellipsoidal reflector).

With video signals and electronic processing a further possibility of undistorting the image exists. In any one particular system the distortion is constant and two dimensional. The distorted picture is related to the undistorted picture by a constant one to one mapping relationship. The possibility therefore exists to undistort the negative perspective image electronically.

Figure 2:
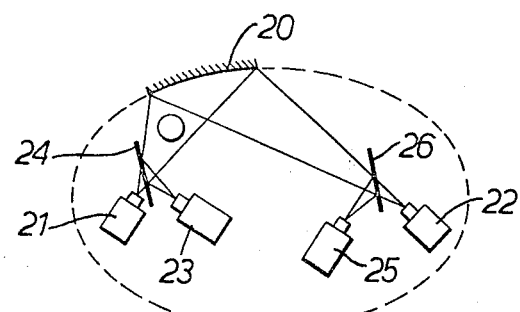
FIGS. 2 and 3 are schematic representations of two further embodiments of the invention.
Figure 3:
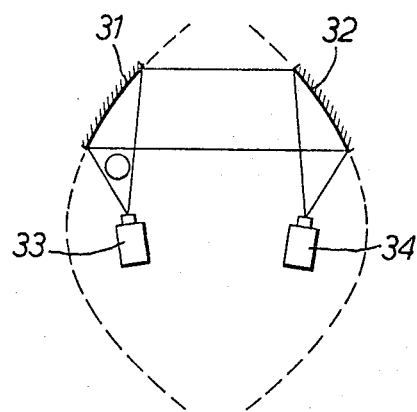

FIGS. 2 and 3 show alternative arrangements for obtaining similar effects to that of the apparatus shown in FIG. 1. FIG. 2 shows an arrangement using an ellipsoidal concave mirror 20 wherein cameras 21 and 22 are placed at the foci of an ellipse notionally produced from the curvature of the mirror. A first background projector 23 projects light on to an optical flat 24 through which camera 21 views the object O. A further background projector 25 projects light on to a further optical flat 26 through which the camera 22 views the normally obscured side of the object O. Using this apparatus it is possible to use travelling mattes or their electronic equivalents, such as chromakey, which require the production of backgrounds of a particular colour, often blue. In the system shown in FIG. 1 it is easy to make parts of the actors face or body invisible by painting them blue. The area surrounding the actor appears dark, however, as camera 21 sees into the lens of camera 22, visa versa. The areas surrounding the actor can be made to take on any colour (simultaneously in both cameras, with the same or different colours) by using the system shown in FIG. 2. It has the following features:

The two projectors hold light filters of wavelength dependent on the background colour.

By means of the optical flats 24, 26 (preferably much less than 50% reflecting) these projectors can be made to project apparently from the positions of the forward nodal points of the respective cameras.

The background for camera 21 is produced by projector 25. A large percentage of the light reflected from the optical flat 26 enters camera 21, hence the light source does not have to be too strong.

A negligable amount of light will enter camera 21 from projector 23 after being reflected from the actors body (unless it is covered in Scotchlite) as on reflection it is disperced in all directions.

All the above features apply to camera 22.

The apparatus thus combines the characteristics of both back-projection and front-projection.

FIG. 3 shows an arrangement using two paraboloidal concave mirrors 31, 32, cameras 33 and 34 being placed at the focus of a respective parabola.

If zero perspective is desired, the real and virtual station points are effectively at infinity and this can be arranged by using a suitable lens system. Further, stereoscopic effects can be achieved using four cameras.

I claim:

1. A method of creating an optical effect comprising disposing a first camera having a focal length $F_1$ with its forward nodal point at a first distance $d_1$ from a lens means of focal length f, imaging an object placed between the first camera and said lens with said first camera, disposing a second camera having a focal length $F_2$ with its forward nodal point at a second distance $d_2$ from the lens with the lens and said object being effectively between said first and second cameras, imaging said object with said second camera, and superimposing the images produced by said first and second cameras, the distances $d_1$ and $d_2$ being determined by the formula $$\frac{1}{d_1} + \frac{1}{d_2} = \frac{1}{f}.$$

2. A method according to claim 1, and comprising obtaining images of the same size in which case the distances $d_1$ and $d_2$ are determined by the formulae $$d_1 = \frac{F_1 + F_2}{F_2} \cdot f$$

$$d_2 = \frac{F_1 + F_2}{F_1} \cdot f$$

3. A method according to claim 1, and comprising providing a background for the image produced by both the first and second cameras.

4. A method according to claim 3, wherein the background is coloured and is the same for each camera.

5. A method according to claim 3, wherein the background foreach camera is provided by a respective optical flat disposed in the optical path between a camera and the object and a projector positioned with respect to said optical flat so that light from the projector is reflected by said flat along the said optical path.

6. A method according to claim 1 wherein the step of superimposing images comprises removing the object projecting the image produced by one of the cameras back toward the other of the cameras, and reimaging the thus projected image with the image produced by the said other of the cameras.

7. Apparatus according to claim 6, wherein the distances $d_1$ and $d_2$ are determined by the formulae $$d_1 = \frac{F_1 + F_2}{F_2} \cdot f$$

$$d_2 = \frac{F_1 + F_2}{F_1} \cdot f$$

8. A method according to claim 1, and comprising providing at least one of the cameras with travelling mattes.

9. A method according to claim 1, and comprising providing at least one of the cameras with a rotascope attachment whereby it can be converted into a projector.

10. Apparatus for providing an optical effect of an object comprising a first camera having a focal length $F_1$, lens means of focal length f disposed at a distance $d_1$ from the forward nodal point of said first camera with the object therebetween, a second camera having a focal length $F_1$ and a forward nodal point which is at a distance $d_2$ from the lens means with the lens means in the optical path between said first and second cameras, and the distances $d_1$ and $d_2$ determined by the formula $$\frac{1}{d_1} + \frac{1}{d_2} = \frac{1}{f},$$

optical flats disposed in the optical paths between the cameras and the said lens means and projection means positioned with respect to each optical flat so that light from the projection means is reflected by said optical flats along said optical paths, and means for superimposing the images produced by the first and second cameras.

11. Apparatus according to claim 10 wherein at least one of the cameras is provided with a bi-pack load for using travelling mattes.

12. Apparatus according to claim 10 wherein at least one of the cameras is provided with a rotascope attachment for converting said camera into a projector.

13. Apparatus according to claim 10 wherein the cameras are cine cameras which are synchronized.

* * * * *